United States Patent
Jang et al.

(10) Patent No.: US 12,475,970 B2
(45) Date of Patent: Nov. 18, 2025

(54) MOKE MEASUREMENT APPARATUS

(71) Applicant: INDUSTRY-UNIVERSITY COOPERATION FOUNDATION HANYANG UNIVERSITY ERICA CAMPUS, Ansan-si (KR)

(72) Inventors: Bum Jin Jang, Ansan-si (KR); Do Hyeok Bae, Seoul (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 166 days.

(21) Appl. No.: 18/455,198

(22) Filed: Aug. 24, 2023

(65) Prior Publication Data

US 2024/0274221 A1    Aug. 15, 2024

(30) Foreign Application Priority Data

Feb. 15, 2023  (KR) .................. 10-2023-0020085
Mar. 30, 2023  (KR) .................. 10-2023-0041805

(51) Int. Cl.
G11C 29/56    (2006.01)
G02F 1/09     (2006.01)
G06F 1/20     (2006.01)

(52) U.S. Cl.
CPC ............... *G11C 29/56* (2013.01); *G02F 1/09* (2013.01); *G06F 1/20* (2013.01)

(58) Field of Classification Search
CPC ... G11C 29/56; G11C 29/56016; G11C 11/16; G11C 2029/0403; G11C 2029/5002; G11C 29/50; G02F 1/09; G06F 1/20
See application file for complete search history.

(56) References Cited

U.S. PATENT DOCUMENTS

2010/0270290 A1* 10/2010 Zach ................. B01L 7/00
                                              219/679
2014/0093658 A1*  4/2014 Zhao ............... B23K 3/0638
                                              427/595

(Continued)

FOREIGN PATENT DOCUMENTS

JP      2016-095264 A       5/2016
KR   10-2015-0018672 A      2/2015

(Continued)

*Primary Examiner* — Lee E Rodak
*Assistant Examiner* — Zannatul Ferdous

(57) ABSTRACT

An apparatus for measuring the magneto-optical Kerr effect (MOKE) of a specimen requiring analysis of magnetic properties, such as a magnetic random access memory (MRAM) or electrical steel sheet, is disclosed. The disclosed MOKE measuring device includes a rotational chuck on which a MOKE measurement target is disposed and which rotates the MOKE measurement target, a first magnetic field generator including a first coil spaced apart from the rotational chuck and tilted at a predetermined angle with respect to the rotational chuck, and configured to generate a magnetic field, a second magnetic field generator including a second coil spaced apart from the rotational chuck and tilted at a predetermined angle with respect to the rotational chuck, and configured to generate a magnetic field, and a frame to which the first and second magnetic field generators are fixed.

9 Claims, 4 Drawing Sheets

(56) References Cited

U.S. PATENT DOCUMENTS

| | | | | |
|---|---|---|---|---|
| 2015/0276520 A1* | 10/2015 | Ursetta | ................... | G01L 3/102 |
| | | | | 73/862.333 |
| 2017/0108495 A1* | 4/2017 | Ikeda | ................. | G01R 33/1269 |
| 2020/0319265 A1* | 10/2020 | Gider | ................. | G01R 33/0017 |
| 2022/0395881 A1* | 12/2022 | Tomizawa | ............. | B21D 7/165 |
| 2023/0125628 A1* | 4/2023 | Ueyama | ............. | G01R 33/1207 |
| | | | | 324/212 |

FOREIGN PATENT DOCUMENTS

| | | |
|---|---|---|
| KR | 10-2019-0111705 A | 10/2019 |
| KR | 10-2063730 B1 | 1/2020 |
| KR | 10-2263648 B1 | 6/2021 |
| KR | 10-2022-0038427 A | 3/2022 |
| KR | 10-2022-0058360 A | 5/2022 |
| KR | 10-2474560 B1 | 12/2022 |

\* cited by examiner

MOKE MEASUREMENT APPARATUS

CROSS-REFERENCE TO RELATED APPLICATIONS

This application claims priority under 35 U.S.C. 119(a) to Korean Patent Application No. 10-2023-0020085 filed on Feb. 15, 2023, in the Korean Intellectual Property Office, and Korean Patent Application No. 10-2023-0041805 filed on Mar. 30, 2023, in the Korean Intellectual Property Office, all of the contents of the above-listed applications are hereby incorporated by reference.

TECHNICAL FIELD

The present disclosure relates to a magneto-optical Kerr effect (MOKE) measuring device, and more particularly, to a device for measuring the MOKE of a specimen requiring analysis of magnetic properties such as a magnetic random access memory (MRAM) or electrical steel sheet.

BACKGROUND ART

The magneto-optical Kerr effect (MOKE) is one effect that occurs when light meets a material and interacts with the material, and is an effect in which polarization rotation occurs in reflected light reflected from a magnetic object. Data representing magnetic characteristics of the measurement object, such as a hysteresis loop, can be obtained from a polarization rotation amount for the reflected light.

Recently, research and development using MOKE measurements has been conducted to analyze the magnetic properties of MRAMs. A magnetic random access memory (MRAM) is a memory using a magnetic thin film, and defects in the MRAM can be detected through MOKE measurements for the magnetic thin film.

DISCLOSURE

Technical Problem

The present disclosure is directed to providing a device capable of measuring the magneto-optical Kerr effect (MOKE) of a magnetic thin film of a magnetic random access memory (MRAM) regardless of the structure of the magnetic thin film of the MRAM.

In addition, the present disclosure is directed to providing a MOKE measurement device capable of analyzing the magnetic properties of the magnetic thin film of the MRAM in an MRAM in-line process.

In addition, the present disclosure is directed to providing a device capable of measuring the MOKE of a magnetic thin film of an MRAM with low power.

In addition, the present disclosure is directed to providing a MOKE measuring device whose performance degradation due to heat generation of a coil can be prevented.

Technical Solution

One aspect of the present disclosure provides a MOKE measuring device including: a rotational chuck on which a MOKE measurement target is disposed and which rotates the MOKE measurement target; a first magnetic field generator including a first coil spaced apart from the rotational chuck and tilted at a predetermined angle with respect to the rotational chuck and configured to generate a magnetic field; a second magnetic field generator including a second coil spaced apart from the rotational chuck and tilted at a predetermined angle with respect to the rotational chuck and configured to generate a magnetic field; and a frame to which the first and second magnetic field generators are fixed.

Another aspect of the present disclosure provides a MOKE measuring device including: a rotational chuck on which a MOKE measurement target is disposed and which rotates the MOKE measurement target; a first magnetic field generator including a first coil disposed to be spaced apart from the rotational chuck and configured to generate a magnetic field; a second magnetic field generator including a second coil disposed to be spaced apart from the rotational chuck and configured to generate a magnetic field; a frame to which the first and second magnetic field generators are fixed; and a control unit configured to adjust positions of the first and second coils so as to adjust a relative position of the first coil with respect to the rotational chuck and a relative position of the second coil with respect to the rotational chuck.

Advantageous Effects

According to an embodiment of the present disclosure, by controlling the orientation of the magnetic field with respect to a magnetic random access memory (MRAM) using a pair of coils, not only can the magneto-optical Kerr effect (MOKE) for the magnetic thin film of the MRAM be measured regardless of the magnetic thin film structure of the MRAM, but also small coils can be used, the MOKE can be measured with low power.

Also, according to one embodiment of the present disclosure, by using the cooling structure of the water cooling tube coupled to the coil, the performance degradation of the MOKE measuring device due to the temperature rise of the coil can be prevented.

MODES OF THE INVENTION

Figure 1:
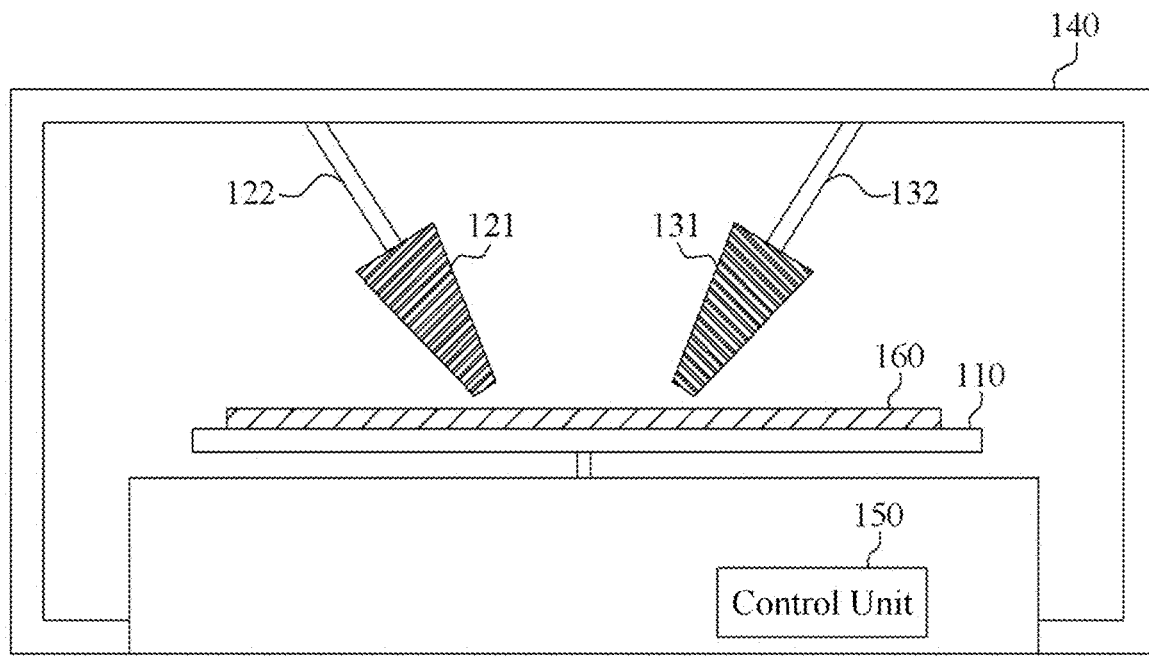
FIG. 1 is a diagram for describing a magneto-optical Kerr effect (MOKE) measuring device according to an embodiment of the present disclosure.

Since the present disclosure can undergo various changes and have various embodiments, specific embodiments will be illustrated in the drawings and described in detail in the detailed description. However, this is not intended to limit the present invention to specific embodiments, and should be understood to include all modifications, equivalents, and substitutes included in the spirit and scope of the present disclosure. Like reference numbers have been used for like elements throughout the description of each figure.

With the development of a magnetic random access memory (MRAM) technology, the structure of the magnetic thin film of an MRAM is changing too. Unlike the in-plane structure of the past, the magnetic thin film of MRAMs mass-produced recently has an out-of-plane structure. In addition, with the future development of MRAM technology, the magnetic thin film structure of MRAMs may be changed into another form.

In order to measure the magneto-optical Kerr effect (MOKE) of the magnetic thin film of an MRAM, the orientation of the magnetic field formed in the MRAM should also be changed according to the structure of the magnetic thin film. Therefore, if an MRAM with a new magnetic thin film structure different from the existing MRAM is developed, the MOKE measuring device for the existing MRAM has a problem in that it is difficult to use for analyzing the magnetic properties of the new MRAM.

Accordingly, the present disclosure proposes a MOKE measuring device capable of analyzing the magnetic properties of a magnetic thin film of an MRAM regardless of the structure of the magnetic thin film of the MRAM.

According to an embodiment of the present disclosure, since the magnetic characteristics of the magnetic thin film of the MRAM can be analyzed regardless of the structure of the magnetic thin film of the MRAM, it can be applied to all processes of manufacturing MRAMs having different magnetic thin film structures. And it can be in-line from the manufacturing process to the magnetic characterization process.

The MOKE measuring device according to an embodiment of the present disclosure can be used not only for MRAMs, but also for various MOKE measurement targets that require magnetic property analysis, and for example, can be used for magnetic property analysis of electrical steel sheets.

Hereinafter, exemplary embodiments of the present disclosure will be described in detail.

Figure 2:
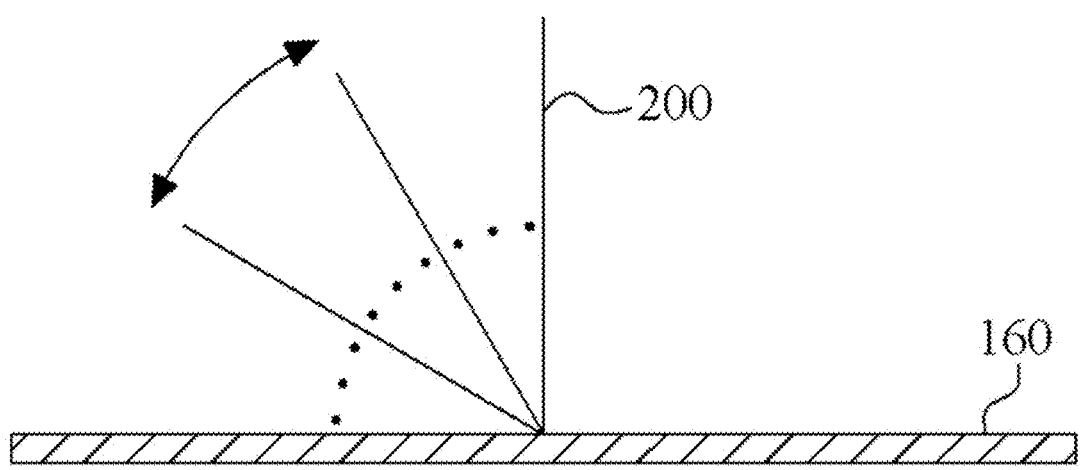
FIG. 2 is a diagram for describing a magnetic field for MOKE measurement according to an embodiment of the present disclosure.

FIG. 1 is a diagram for describing a MOKE measuring device according to an embodiment of the present disclosure and FIG. 2 is a diagram for describing a magnetic field for MOKE measurement according to an embodiment of the present disclosure.

Referring to FIG. 1, the MOKE measuring device according to the embodiment of the present disclosure may include a rotational chuck 110, a first magnetic field generator, a second magnetic field generator and a frame 140, and in some embodiments, may further include a control unit 150.

A MOKE measurement target 160 is disposed on the rotational chuck 110, and the rotational chuck 110 rotates the MOKE measurement target 160. The MOKE measurement target 160 may be rotated while fixed to the rotational chuck 110 by being suctioned in a vacuum state. The magnetic fields generated by the first and second magnetic field generators described below are in the form of a two-dimensional plane, and a three-dimensional magnetic field may be formed with respect to the MOKE measurement target 160 by rotation of the MOKE measurement target 160. The MOKE measurement target 160 may be a wafer on which MRAM dies are formed or an electrical steel sheet.

The first and second magnetic field generators generate magnetic fields for MOKE measurement. The first and second magnetic field generators respectively includes first and second coils 121 and 131 spaced apart from the rotational chuck 110 and inclined at a preset angle with respect to the flat rotational chuck 110. That is, the first and second coils 121 and 131 may be disposed to be spaced apart from the rotational chuck 110 so that the distance between one ends of the first and second coils 121 and 131 is greater than the distance between the other ends of the first and second coils 121 and 131. Here, the one ends of the first and second coils 121 and 131 may be the closest points to the rotational chuck 110 in the first and second coils 121 and 131, and the other ends of the first and second coils 121 and 131 may be the farthest points from the rotational chuck 110 in the first and second coils 121 and 131. When a current flows through the first and second coils 121 and 131, a magnetic field for MOKE measurement may be formed.

When the first and second coils 121 and 131 are arranged vertically or horizontally with respect to the rotational chuck 110, although the orientation of the magnetic field with respect to the MOKE measurement target 160 is fixed in the vertical or horizontal direction, in one embodiment of the disclosure, since the first and second coils 121 and 131 are disposed to be inclined with respect to the rotational chuck 110, the intensity of the current flowing through the first and second coils 121 and 131 may be adjusted, and thus the orientation of the magnetic field with respect to the MOKE measurement target 160 can be adjusted. The magnetic field generated by the first and second coils 121 and 131 is a two-dimensional magnetic field with a planar shape, and the orientation of the magnetic field relative to the MOKE measurement target 160 corresponds to an angle between the MOKE measurement target 160 and the two-dimensional magnetic field.

According to the intensity of the current flowing through the first and second coils 121 and 131, the two-dimensional magnetic field 200, as shown in FIG. 2, is formed in a direction ranging from a direction parallel to the MOKE measurement target 160 to a direction perpendicular thereto.

The first and second magnetic field generators may be disposed above or below the rotational chuck 110 and may be disposed only at any one of an upper side or a lower side of the rotational chuck 110. For example, as shown in FIG. 1, when the first magnetic field generator is disposed above the rotational chuck 110, the second magnetic field generator is also disposed above the rotational chuck 110. When the first magnetic field generator is disposed below the chuck 110, the second magnetic field generator may also be disposed below the rotational chuck 110.

The first and second magnetic field generators may be fixed to the frame 140, and the first and second magnetic field generators may be fixed at positions facing each other on the frame 140.

The first and second magnetic field generators may respectively include cores on which the first and second coils 121 and 131 are wound, and may respectively include connecting parts 122 and 132 connecting the cores and the frame 140, the first and second coils 121 and 131 may be wound around the respective cores in a conical shape so that the magnetic field may be concentrated on the MOKE measurement target 160. Also, the cores may have a conical shape so that the first and second coils 121 and 131 may be wound in a conical shape.

The control unit 150 adjusts the positions of the first and second coils 121 and 131 so that the relative position of the first coil 121 with respect to the rotational chuck 110 and the second coil 131 with respect to the rotational chuck 110 may be adjusted and the intensity of a current flowing through the first and second coils 121 and 131 may be adjusted. Alternatively, the flow of cooling water described below may be controlled.

According to one embodiment, the control unit 150 adjusts an angle between the connecting parts 122 and 132 and the frame 140 by rotating the connecting parts 122 and 132, thereby adjusting the positions of the first and second coils 121 and 131. It is possible to adjust the angle between the connecting parts 122 and 132 and the frame 140 by controlling an actuator that rotates the connecting parts 122 and 132.

By adjusting the positions of the first and second coils 121 and 131, the orientation of the magnetic field may be more precisely controlled.

According to one embodiment, the positions of the first and second coils 121 and 131 may be adjusted by the control unit 150 regardless of the shape, arrangement position, or attitude of the first and second coils 121 and 131.

According to one embodiment of the present disclosure, by controlling the orientation of the magnetic field with respect to the MRAM using a pair of coils, not only can the MOKE for the magnetic thin film of the MRAM be measured regardless of the magnetic thin film structure of the MRAM, but also since small coils can be used, the MOKE may be measured with low power.

Figure 3:
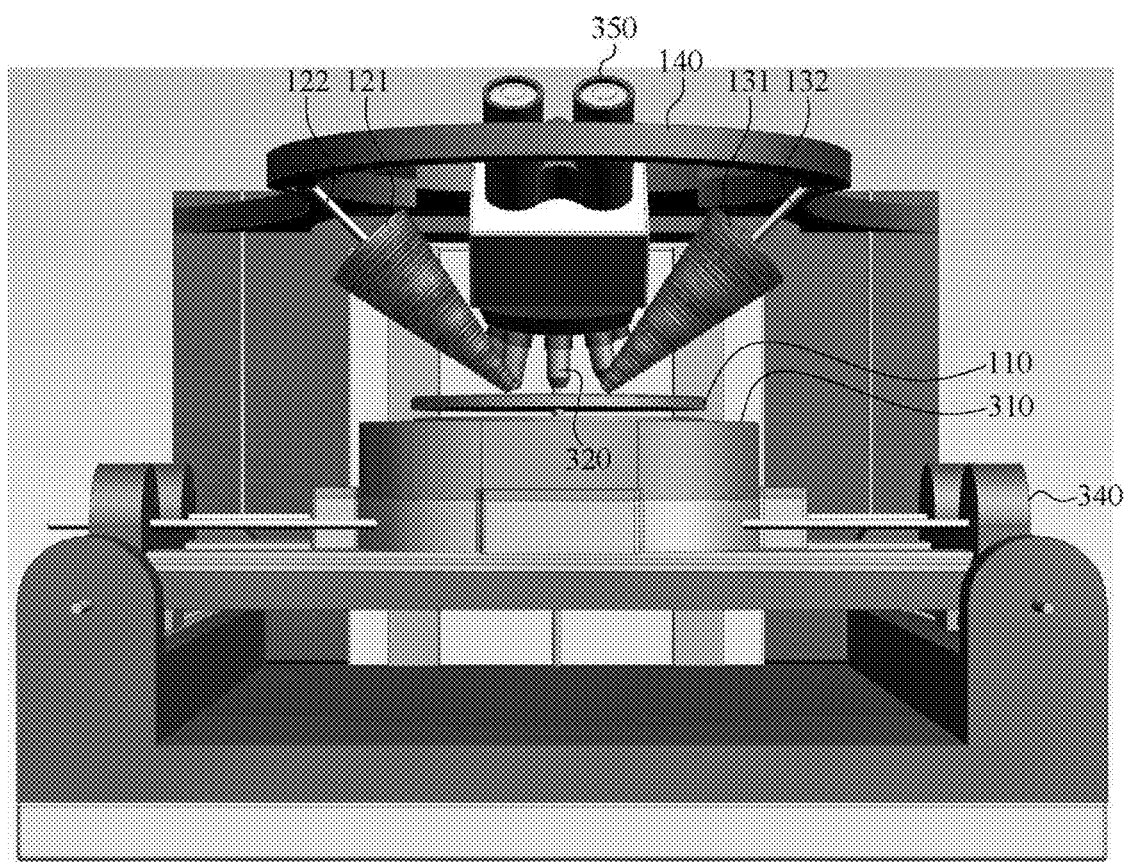
FIGS. 3 and 4 are diagrams for describing a MOKE measuring device according to another embodiment of the present disclosure.
Figure 4:
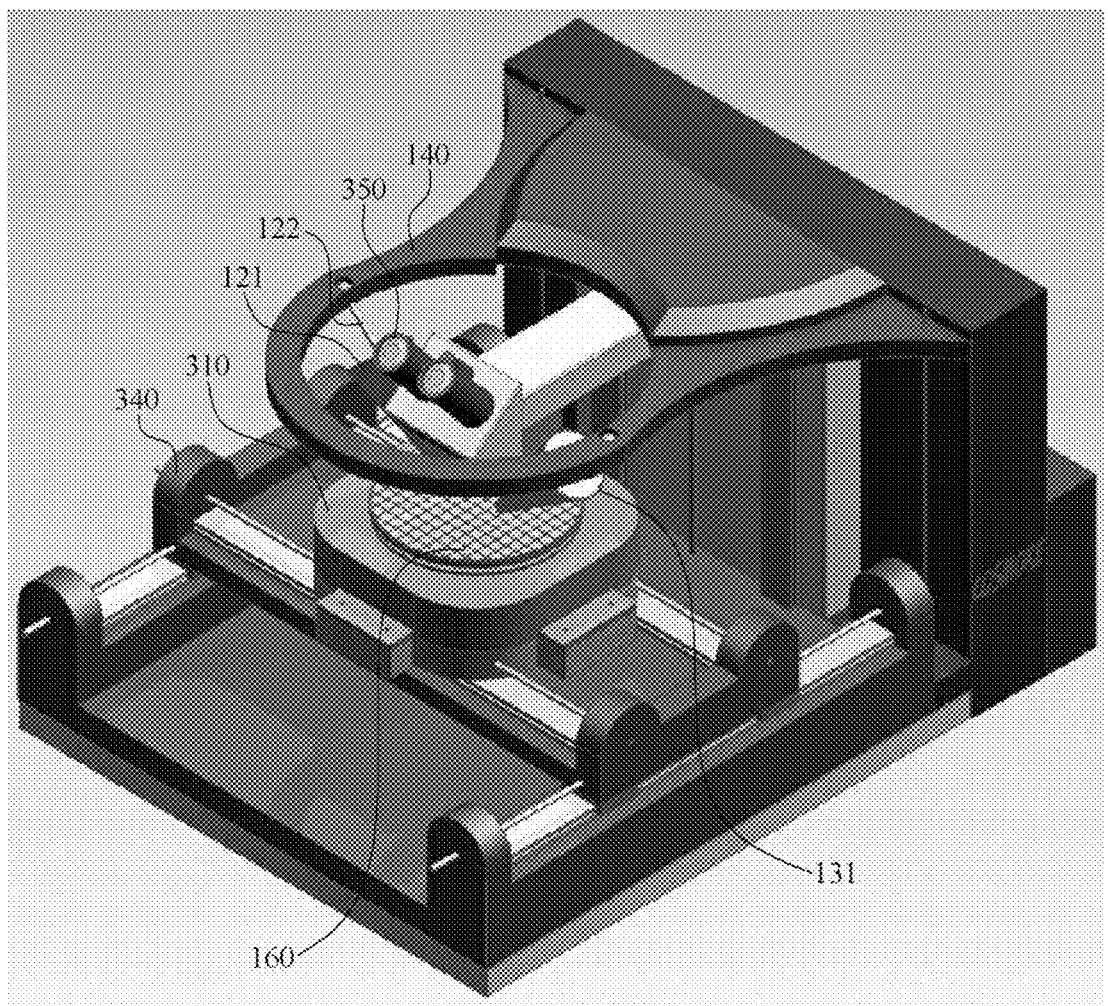

FIGS. 3 and 4 are diagrams for describing a MOKE measuring device according to another embodiment of the present disclosure and FIG. 3 shows a front view of the MOKE measuring device, and FIG. 4 shows a perspective view of the MOKE measuring device.

Referring to FIGS. 3 and 4, compared to the embodiment of FIG. 1, the MOKE measuring device according to another embodiment of the present disclosure further includes a stage 310, a light source, an optical lens 320, and a third magnetic field generator, and in some embodiments, the MOKE measuring device may further include an LM guide 340, an eyepiece 350, a detection unit, and the like.

The stage 310 may move the rotational chuck 110 and move the rotational chuck 110 in the X-axis, Y-axis, and Z-axis directions. The LM guide 340 or the like may be used to move the rotational chuck 110. As the stage 310 is moved by the LM guide 340, the rotational chuck 110 coupled to the stage 310 can move. As the rotational chuck 110 moves in the three-axis direction, a magnetic field may be formed with respect to a specific location of the MOKE measurement target, for example, a specific MRAM die.

The light source radiates light to the MOKE measurement target, and the optical lens 320 receives the reflected light reflected from the MOKE measurement target. In addition, the detector detects a polarization rotation amount for the reflected light. The user may check the polarization rotation amount in real time through the eyepiece 350 or an image of the polarization rotation amount may be provided to the user.

Meanwhile, when the first and second magnetic field generators are positioned above the rotational chuck 110, the rotational displacement of the first and second coils 121 and 131 is limited by the optical lens 320, and as a result, the orientation of the magnetic field may also be limited. Accordingly, in order to increase the rotational displacement of the first and second coils 121 and 131, the first and second magnetic field generators may be positioned below the rotational chuck 110.

For example, when the optical lens 320 is present, an angle between the first and second coils 121 and 131 positioned above the rotational chuck 110 may be adjusted to between 45 degrees and 180 degrees. Since the optical lens 320 is not present below the rotational chuck 110, the first and second coils 121 and 131 positioned below the rotational chuck 110 may be relatively closer. Also, the angle between the first and second coils 121 and 131 positioned below the rotational chuck 110 may be adjusted to between 15 degrees and 180 degrees.

When the first and second magnetic field generators are positioned below the rotational chuck 110, the separation distance between the rotational chuck 110 and the stage 310 may increase.

In some embodiments, a third magnetic field generator may be used, and the third magnetic field generator may include a coil wound around the optical lens 320.

Figure 5:
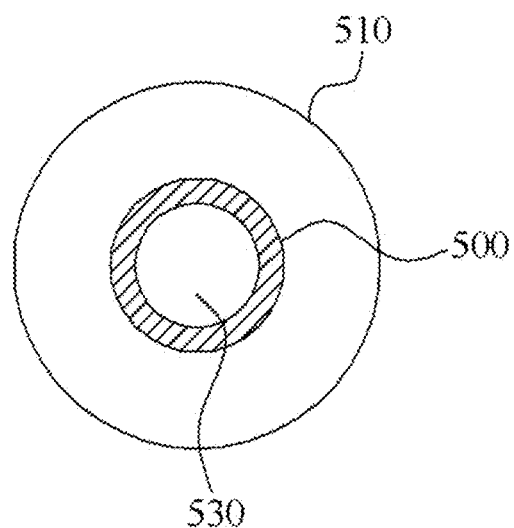
FIGS. 5 and 6 are diagrams for describing a coil cooling structure according to an embodiment of the present disclosure.
Figure 6:
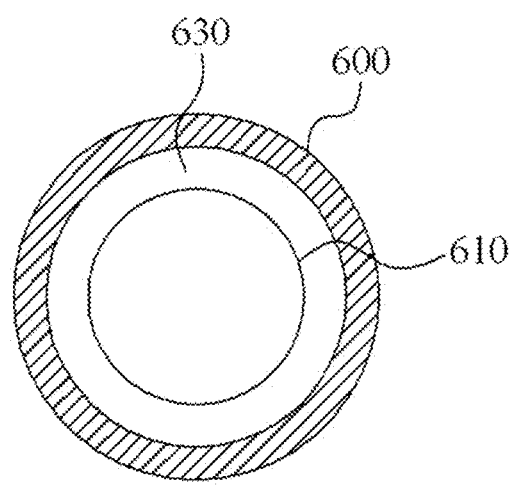

FIGS. 5 and 6 are diagrams for describing a coil cooling structure according to an embodiment of the present disclosure, and show cross-sections perpendicular to the longitudinal direction of a coil.

When a current flows through the coil for a long time, the performance of the MOKE measuring device can be degraded due to an increase in the temperature of the coil. Therefore, in order to cool the coil, the MOKE measuring device according to the embodiment of the present disclosure may include a water cooling tube which is coupled to the coil and through which cooling water flows. The coil cooling structure in which the coil and the water cooling tube are integrated may be applied to various MOKE measuring devices including a rotational chuck and a magnetic field generator as well as the MOKE measuring devices described in FIGS. 1 to 4.

As shown in FIG. 5, the water cooling tube 500 may have a shape passing through the inside of the coil 510 in the longitudinal direction. As an example, the water cooling tube 500 may be inserted into a tubular coil 510. In order to increase the cooling effect, it is preferable that the water cooling tube 500 through which the cooling water 530 flows be formed inside the coil while the outer circumferential surface of the water cooling tube 500 is in contact with the coil 510. In the above-described embodiment, the water cooling tube 500 may be formed inside each of the first and second coils 121 and 131.

Alternatively, a water cooling tube 600 may have a shape surrounding the outer circumferential surface of a coil 610 as shown in FIG. 6. As an example, the coil 610 may be inserted into the water cooling tube 600 having a larger diameter than the diameter of the coil 610, and the cooling water 630 may flow in a separation space between the water cooling tube 600 and the coil 610. In the above-described embodiment, each of the first and second coils 121 and 131 may be inserted into the water cooling tube 600.

As described above, the present disclosure has been described with specific details such as specific components and limited embodiments and drawings, but these are provided only to help a more general understanding of the present disclosure, and the present disclosure is not limited to the embodiments. Various modifications and variations from these descriptions are possible to those skilled in the art in the field to which the present disclosure belongs. Therefore, the spirit of the present disclosure should not be limited to the described embodiments, and it will be said that not only the claims to be described below, but also all modifications equivalent to these claims belong to the scope of the present disclosure.

What is claimed is:

1. A magneto-optical Kerr effect (MOKE) measuring device comprising:
   a rotational chuck that vacuum-absorbs and rotates a plate-shaped MOKE measurement target on which a magnetic random access memory (MRAM) die is formed;
   a frame arranged on an upper portion of the rotational chuck;
   a first magnetic field generator that is connected to the frame through a first connecting portion and includes a first coil arranged to be inclined at a preset angle with respect to the rotational chuck and generates a magnetic field;

a second magnetic field generator that is connected to the frame through a second connecting portion and includes a second coil arranged to be inclined at a preset angle with respect to the rotational chuck and generates a magnetic field;

a stage that linearly moves the rotational chuck so that a relative position of the rotational chuck is adjusted with respect to the first coil and the second coil; and a control unit that rotates the first connecting portion and the second connecting portion to control an angle between the first and second connecting portions and the frame and to adjust positions of the first and second coils.

2. The MOKE measuring device of claim 1, wherein a distance between one ends of the first and second coils is greater than a distance between the other ends of the first and second coils.

3. The MOKE measuring device of claim 1, wherein the first and second magnetic field generators are fixed at positions facing each other on the frame.

4. The MOKE measuring device of claim 1, wherein the first and second magnetic field generators include:

cores on which the first and second coils are wound, respectively.

5. The MOKE measuring device of claim 4, wherein the first and second coils are wound in a conical shape.

6. The MOKE measuring device of claim 1, the first and second magnetic field generators further include water cooling tubes passing through inside of the first and second coils in a longitudinal direction, respectively.

7. The MOKE measuring device of claim 1, the first and second magnetic field generators further include water cooling tubes into which the first and second coils are inserted, respectively.

8. The MOKE measuring device of claim 1, further comprising:

a light source configured to radiate light to the MOKE measurement target;

an optical lens configured to receive reflected light reflected from the MOKE measurement target; and a third magnetic field generator including a coil wound around the optical lens.

9. The MOKE measuring device of claim 1, the MOKE measurement target is a wafer on which the MRAM die is formed or electrical steel sheet.

* * * * *